United States Patent
Glendenning et al.

(10) Patent No.: US 11,343,958 B2
(45) Date of Patent: May 31, 2022

(54) HIGH FLOW FERTILIZER/AIR METER WITH SECONDARY NOZZLING

(71) Applicant: Lynx Ag, LLC, Churdan, IA (US)

(72) Inventors: Terry Glendenning, Churdan, IA (US); Lance Glendenning, Churdan, IA (US)

(73) Assignee: Lynx Ag, LLC, Churdan, IA (US)

( * ) Notice: Subject to any disclaimer, the term of this patent is extended or adjusted under 35 U.S.C. 154(b) by 0 days.

(21) Appl. No.: 16/552,317

(22) Filed: Aug. 27, 2019

(65) Prior Publication Data

US 2020/0060070 A1 Feb. 27, 2020

Related U.S. Application Data

(60) Provisional application No. 62/723,063, filed on Aug. 27, 2018.

(51) Int. Cl.
| | | |
|---|---|---|
| *A01C 7/08* | (2006.01) | |
| *A01C 7/00* | (2006.01) | |
| *F04F 1/18* | (2006.01) | |
| *A01C 7/06* | (2006.01) | |
| *A01C 5/06* | (2006.01) | |

(52) U.S. Cl.
CPC .............. *A01C 7/082* (2013.01); *A01C 7/004* (2013.01); *A01C 7/06* (2013.01); *F04F 1/18* (2013.01); *A01C 5/062* (2013.01)

(58) Field of Classification Search
CPC ........ B65G 53/02; B65G 53/14; B65G 53/42; B65G 53/20; A01C 7/06; A01C 7/081; A01C 7/082; A01C 7/084
USPC ......... 406/123, 144, 155, 192; 111/174, 175
See application file for complete search history.

(56) References Cited

U.S. PATENT DOCUMENTS

| | | | | |
|---|---|---|---|---|
| 3,574,410 | A * | 4/1971 | Buschor | B05B 7/1477 406/123 |
| 4,296,695 | A * | 10/1981 | Quanbeck | A01C 15/04 111/186 |
| 4,453,866 | A * | 6/1984 | Ryan | B65G 53/40 111/34 |
| 4,475,819 | A * | 10/1984 | Balmer | A01C 15/04 239/654 |
| 4,824,295 | A * | 4/1989 | Sharpless | B05B 7/1454 406/109 |
| 2015/0189827 | A1* | 7/2015 | Gilstring | A01C 7/082 222/1 |
| 2017/0055437 | A1* | 3/2017 | Thompson | A01C 7/081 |
| 2018/0002113 | A1* | 1/2018 | Drenth | A01C 19/00 |
| 2018/0317379 | A1* | 11/2018 | Pirkenseer | A01C 7/084 |

(Continued)

*Primary Examiner* — Joseph A Dillon, Jr.
(74) *Attorney, Agent, or Firm* — McKee, Voorhees & Sease, PLC

(57) ABSTRACT

Agricultural implements are used to transport material, such as inputs in the form of fertilizer, seed, treatment, or some combination thereof, to row units that apply the material to an area of a field. Metering systems can aid in metering and providing a desired amount of material, such as on-demand, to the row units. The metering systems move the metered material to the row units, such as with pneumatics or other fluids. The metering system can be improved by having primary and secondary nozzles of different sizes, which aid in increasing the speed of the fluid moving the material towards the row units. For example, a smaller diameter for the secondary nozzle will provide improved suction and air speed.

9 Claims, 17 Drawing Sheets

(56) References Cited

U.S. PATENT DOCUMENTS

| | | | |
|---|---|---|---|
| 2019/0069474 A1* | 3/2019 | Kowalchuk | A01C 7/127 |
| 2019/0239422 A1* | 8/2019 | Johnson | A01C 7/081 |
| 2019/0382217 A1* | 12/2019 | Borkgren | B65G 53/04 |
| 2019/0387666 A1* | 12/2019 | Harmon | A01C 7/081 |
| 2020/0053955 A1* | 2/2020 | Borkgren | A01C 7/06 |
| 2020/0107496 A1* | 4/2020 | Gray | A01C 15/122 |
| 2020/0245543 A1* | 8/2020 | Collins | B01F 15/00194 |
| 2020/0245544 A1* | 8/2020 | Erker | B01F 7/00408 |
| 2020/0296883 A1* | 9/2020 | Thompson | A01C 7/082 |
| 2021/0076559 A1* | 3/2021 | Johnson | A01C 7/082 |
| 2021/0229937 A1* | 7/2021 | Borkgren | A01C 7/082 |
| 2021/0267118 A1* | 9/2021 | Plattner | G01C 21/3807 |

* cited by examiner

HIGH FLOW FERTILIZER/AIR METER WITH SECONDARY NOZZLING

CROSS REFERENCE TO RELATED APPLICATIONS

This application claims priority under 35 U.S.C. § 119 to provisional patent application U.S. Ser. No. 62/723,063, filed Aug. 27, 2018. The provisional patent application is herein incorporated by reference in its entirety, including without limitation, the specification, claims, and abstract, as well as any figures, tables, appendices, or drawings thereof.

FIELD OF THE INVENTION

The invention relates generally to the field of agricultural implements. More particularly, but not exclusively, the invention relates to systems, methods, and/or apparatus for delivering particulate material in and among an agricultural implement, such as to one or more row units, injection points, and/or delivery points thereof.

BACKGROUND OF THE INVENTION

Agricultural implements perform a number of functions and/or operations. These can include, but are not limited to, applying a particulate (solid, liquid, or combination) in, or, or around a field and/or crop. The application can take many forms, such as broadcasting, spraying, spreading, metered application, planting, or the like. The types of application can depend, at least partly, on the precision needed, mixing, amounts needed, type of crop, type of application, soil type, time of year, and/or other factors that could affect the application process.

Furthermore, fields come in many different sizes, and also include variations with respect to elevation, soil type, contours, geography, weather conditions, and the like. The implements can include hoppers or other containment portions to hold large amounts of material (particulate or liquid) that can then be applied to the field and/or crop without needing to refill as often. The containment portions, which may be bins or hoppers, can hold larger amounts of the application material and then can selectively deliver the material to one or more row units separate from but attached to the bins or hoppers to receive the material and to apply the same in a more locally controlled manner (i.e., in or around a row of planted crop(s)).

The delivery of the material from the bins or hoppers to the row units is therefore important, as there needs to be control in how much of the material is delivered. In addition, as the material often includes particulate matter, there can be difficulty in moving the material to each and all of the row units, especially when there are multiple row units and the end rows are more removed from the hoppers or bins.

Many implements utilize pneumatics (e.g., air) to move the material. Conduits are connected between the hoppers or bins and one or more of the row units to supply on-demand amounts of the material to the row units for application thereby and thereat. The pneumatics are generally provided by one or more fans that move the material from the hoppers to the row units, such as via the Venturi effect. The Venturi effect is the reduction in fluid pressure that results when a fluid flows through a constricted section (or choke) of a pipe. In addition, in implements without row units per se, the same process is used with respect to the end use location of the application (e.g., injection point, application point, etc.).

However, while this has been found to be a successful method for moving the material, the systems to date have some deficiencies and/or limitations. Therefore, the invention disclosed provides for numerous improvements and/or advantages over the pneumatic systems as currently used.

SUMMARY OF THE INVENTION

Therefore, it is a principal object, feature, and/or advantage of the disclosed features to overcome the deficiencies in the art.

It is another object, feature, and/or advantage of the invention to include the ability to move materials, such as particulate materials, varying in weight and size.

It is yet another object, feature, and/or advantage to reduce and/or mitigate plugging in conduits used to move particulate material in an agricultural implement.

It is still another object, feature, and/or advantage to move and deliver high volumes of product within an agricultural implement.

It is another object, feature, and/or advantage to reduce dust.

It is still another object, feature, and/or advantage to include an agricultural implement that includes a material moving system that does not include mechanical seals.

It is a further object, feature, and/or advantage to include a material moving system that has open chambers for easy cleaning.

It is yet a further object, feature, and/or advantage to have a material moving system of an agricultural implement that does not require a pressurized tank.

It is still a further object, feature, and/or advantage to provide a material delivery and/or moving system of an agricultural implement that provides the ability to move product farther in conduits than with existing systems.

According to some aspects of the invention, an agricultural implement includes at least one bin for holding a material to be applied, a plurality of row units operatively connected to the at least one bin to receive an amount of the material and to apply the material, and a material moving meter assembly. The material moving meter assembly includes a meter comprising a plurality of segments for receiving material from the at least one bin, a plurality of primary nozzles in communication with inlets of the plurality of segments, and a plurality of secondary nozzles at outlets of the plurality of segments. A fan for providing pressurized air to the meter is also included.

According to some embodiments, the invention also comprises a plurality of conduits, wherein each of the plurality of conduits communicates material from a segment to a row unit.

According to at least some embodiments, the meter comprises a face and a chamber.

According to at least some embodiments, the face of the meter includes a plurality of walls that separate and define the plurality of segments of the meter.

According to at least some embodiments, the chamber of the meter comprises an inlet in communication with the fan, and a plurality of outlets in communication with the plurality of segments of the meter.

According to at least some embodiments, the primary nozzles are positioned at least partially within the outlets of the chamber of the meter.

According to at least some embodiments, the secondary nozzles are positioned at least partially within conduit connectors.

According to at least some embodiments, a ratio of area for sizes of the primary nozzle to the secondary nozzle is about 1:1.9.

According to at least some embodiments, the primary nozzle has an inner diameter of about 0.9-inch, and the secondary nozzle has an inner diameter of about 1.25-inches.

Additional aspects of the invention include a material moving meter assembly, comprising a meter, comprising a chamber comprising an inlet and a plurality of outlets, wherein the plurality of outlets include a primary nozzle at least partially in each of the plurality of outlets; and a meter face comprising a plurality of segments in communication with the plurality of outlets of the chamber, each of the plurality of segments including a segment outlet for communicating seed to a row unit, and wherein the plurality of segment outlets includes a secondary nozzle at least partially in each of the plurality of segment outlets; and a fluid source for communicating fluid into and through the meter.

According to at least some embodiments, a ratio of area for sizes of the primary nozzle to the secondary nozzle is about 1:1.9.

According to at least some embodiments, the primary nozzle has an inner diameter of about 0.9-inch, and the secondary nozzle has an inner diameter of about 1.25-inches.

Some of the embodiments of the assembly further comprise a plurality of walls opposite the plurality of outlets, and wherein the plurality of walls define the plurality of segments.

According to at least some embodiments, the plurality of outlets of the chamber are staggered vertically, and wherein the segments correspond to the staggered outlets.

According to at least some embodiments, the fluid source is in fluid communication with the inlet of the chamber.

According to at least some embodiments, the fluid source comprises a fan.

Still further aspects of the invention include an agricultural implement, comprising at least one bin for holding a material to be applied; a meter for receiving the material to be applied and to communicate the material to one or more row units, the meter comprising: a chamber comprising an inlet and a plurality of outlets, wherein the plurality of outlets include a primary nozzle at least partially in each of the plurality of outlets; and a meter face comprising a plurality of segments in communication with the plurality of outlets of the chamber, each of the plurality of segments including a segment outlet for communicating seed to a row unit, and wherein the plurality of segment outlets includes a secondary nozzle at least partially in each of the plurality of segment outlets; and a fluid source for communicating fluid into and through the meter.

According to at least some embodiments, a ratio of area for sizes of the primary nozzle to the secondary nozzle is about 1:1.9.

According to at least some embodiments, the primary nozzle has an inner diameter of about 0.9-inch, and the secondary nozzle has an inner diameter of about 1.25-inches.

Some embodiments further comprise a plurality of couplings, wherein the couplings correspond with the secondary nozzles to provide a connection to a conduit between the meter and a corresponding row unit.

These and/or other objects, features, and advantages of the disclosure will be apparent to those skilled in the art. The present invention is not to be limited to or by these objects, features and advantages. No single embodiment need provide each and every object, feature, or advantage.

Figure 1:
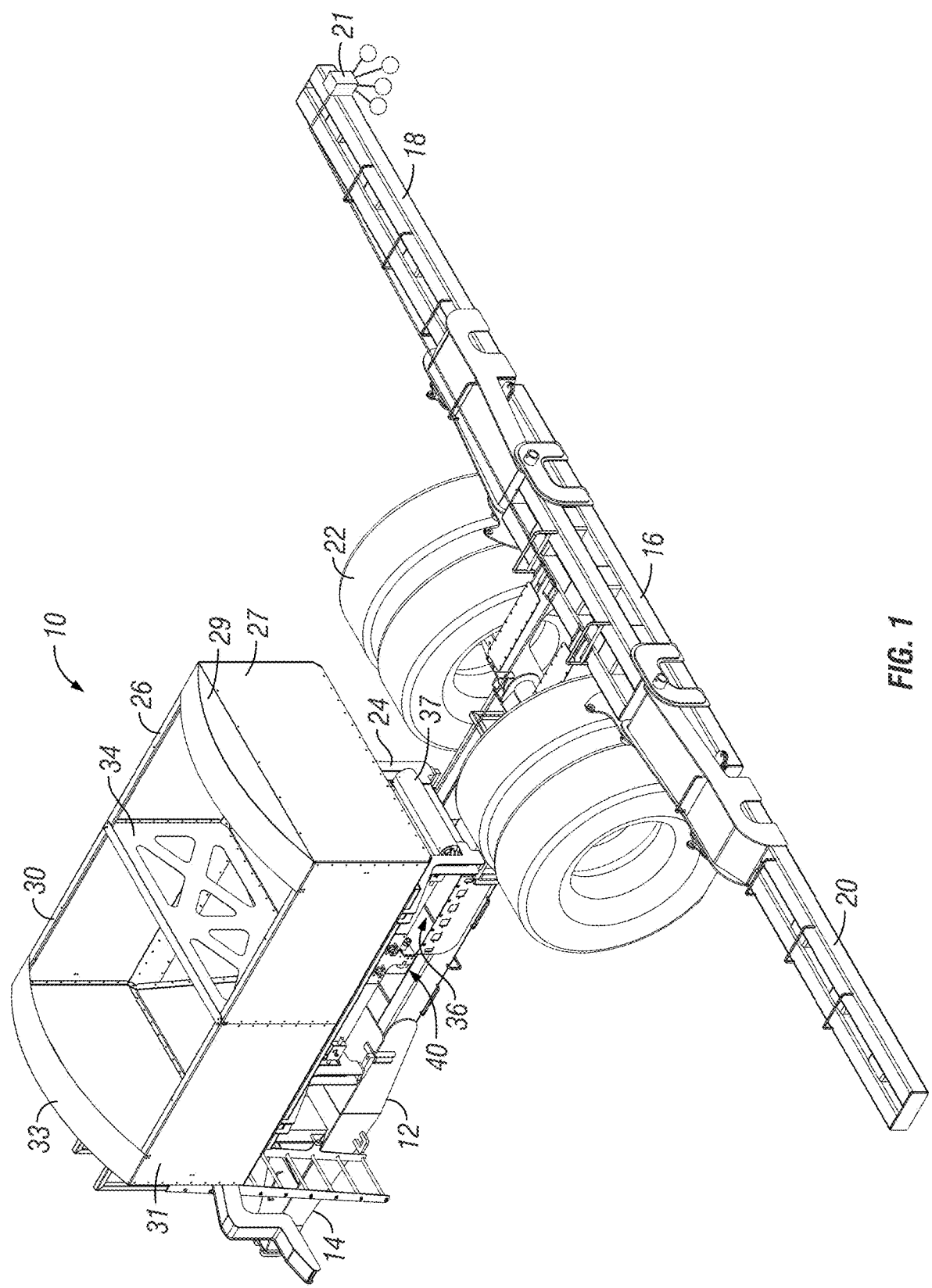
FIG. 1 is a perspective view of an agricultural implement including a material moving system according to aspects of the invention.
Figure 2:
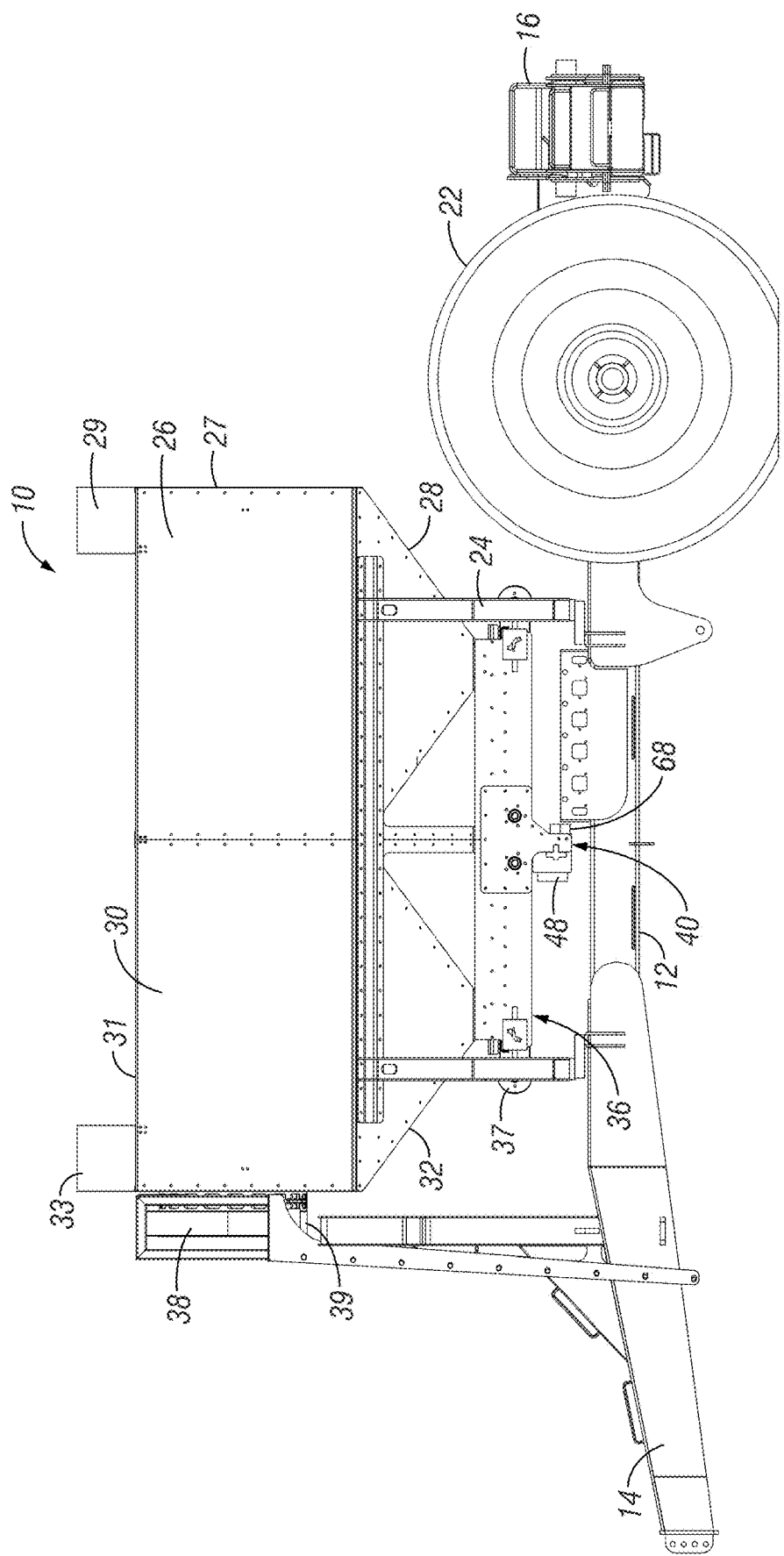
FIG. 2 is a side elevation view of the agricultural implement.
Figure 3:
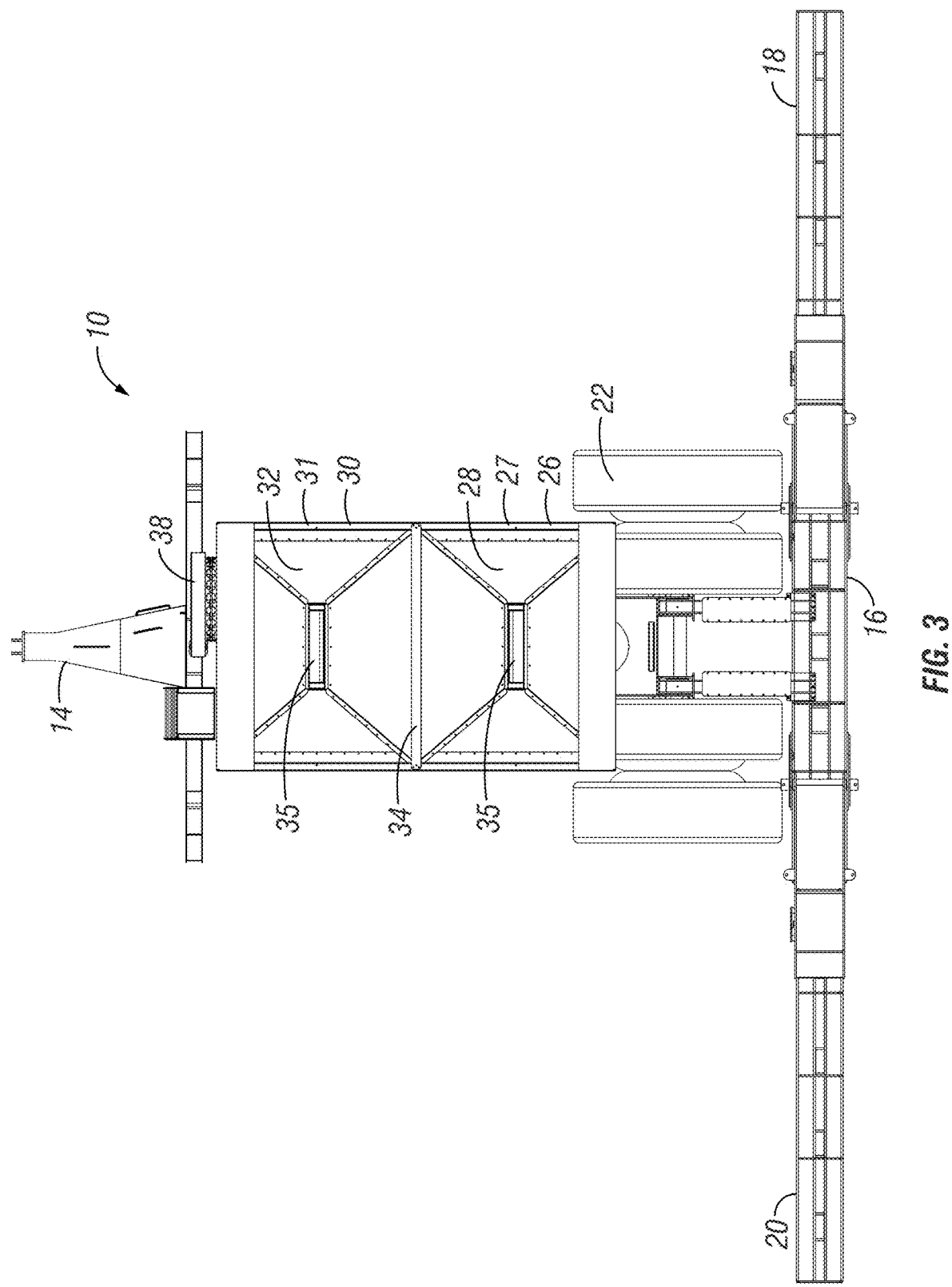
FIG. 3 is a top plan view of the agricultural implement.

Various embodiments of a delivery system and related components are described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE INVENTION

The following definitions and introductory matters are provided to facilitate an understanding of the present invention. Unless defined otherwise, all technical and scientific terms used herein have the same meaning as commonly understood by one of ordinary skill in the art to which embodiments of the present invention pertain.

The terms "a," "an," and "the" include plural referents unless context clearly indicates otherwise. Similarly, the word "or" is intended to include "and" unless context clearly indicate otherwise. The word "or" means any one member of a particular list and also includes any combination of members of that list.

The terms "invention" or "present invention" as used herein are not intended to refer to any single embodiment of the particular invention but encompass all possible embodiments as described in the specification and the claims.

The term "about" as used herein refers to variation in the numerical quantities that can occur, for example, through typical measuring techniques and equipment, with respect to any quantifiable variable, including, but not limited to, mass, volume, time, distance, wave length, frequency, voltage, current, and electromagnetic field. Further, given solid and liquid handling procedures used in the real world, there is certain inadvertent error and variation that is likely through differences in the manufacture, source, or purity of the ingredients used to make the compositions or carry out the methods and the like. The claims include equivalents to the quantities whether or not modified by the term "about."

The term "configured" describes an apparatus, system, or other structure that is constructed or configured to perform a particular task or to adopt a particular configuration. The term "configured" can be used interchangeably with other similar phrases such as constructed, arranged, adapted, manufactured, and the like.

Terms such as first, second, vertical, horizontal, top, bottom, upper, lower, front, rear, end, sides, concave, convex, and the like, are referenced according to the views presented. These terms are used only for purposes of description and are not limiting. Orientation of an object or a combination of objects may change without departing from the scope of the invention.

The apparatuses, systems, and methods of the present invention may comprise, consist essentially of, or consist of the components of the present invention described herein. The term "consisting essentially of" means that the apparatuses, systems, and methods may include additional components or steps, but only if the additional components or steps do not materially alter the basic and novel characteristics of the claimed apparatuses, systems, and methods.

The following embodiments are described in sufficient detail to enable those skilled in the art to practice the invention however other embodiments may be utilized. Mechanical, procedural, and other changes may be made without departing from the spirit and scope of the invention. Accordingly, the scope of the invention is defined only by the appended claims, along with the full scope of equivalents to which such claims are entitled.

The invention can be used with agricultural implements. Such agricultural implements can be of the type which meter and/or disburse a material come as such as a particulate material to a field and/or crop. The disbursement can come in the form of broadcasting, spraying, spreading, metering, planting, or the like. The types of particulate material are not to be limiting to the present invention, but generally include some sort of granular material, such as, but not limited to, fertilizer, seed, treatment, or some combination thereof. For example, according to some aspects of the invention, the implement will be used to disburse or distribute dry fertilizer to a field and/or crop. However, it should be appreciated that the aspects of the invention can be generally used with any implement capable of dispensing or otherwise dispersing a material. Furthermore, while particular implements are shown inscribed here, they are intended to be used for exemplary purposes, and not to be limiting to the invention itself.

As will be understood, aspects of the invention are directed towards a pneumatic conveyor system which uses pressurized air passing through a material moving assembly, such as a metering assembly, to move the material to be dispersed from a containment portion of an implement (i.e. bin or hopper) to an application portion of the implement (i.e., row unit or other ground engaging component). The use of the pneumatics in the system, which may be pressurized air, provides for an efficient and low energy way to move material in an on-demand manner to the application point to maintain material at the application point as the implement moves through a field. The use of the conveyor system using the pressurized air allows for the system to maintain the material at the row units or other ground engaging components of the implement to continue the disbursement there from as desired while moving through a field.

FIGS. 1-3 depict an implement 10 including aspects of the invention. The implement 10 shown on FIG. 1 is a dry injection or broadcast implement for applying or otherwise dispersing dry fertilizer material. The implement 10 includes a frame 12 with a tongue 14 at a first end of the frame and a tool bar at the opposite end thereof. The toolbar 16 may also be referred as a boom, and includes a middle portion 16, a first wing portion 18, and a second wing portion 20. The boom or tool bar provides for an elongated member for which row units 21 are able to be attached. The length of the tool bar may designate or otherwise be associated with the number of row units 21 attached thereto. For example, it is contemplated that the invention be utilized such that an implement can include any number of row units attached thereto. Therefore, the spacing and number of row units 21 are not to be a limiting and instead, are to be used for exemplary purposes herein.

According to some aspects of the invention, the row unit 21 may be a strip till unit for applying a fertilizer to a field. However, additional types of row units including fertilizers, planters, seeder, air carts, ground engaging tools, or the like may be included for use with implement 10, such as attached to the tool bar 16 thereof. Additional components of the implement 10 include a number of wheels 22 for allowing movement of the implement in and outside of a field. It should be appreciated that the wheels could be replaced with tracks as well. A bin frame 24 is connected to the main frame 12 and is utilized to support and hold one or more bins. A shown in FIG. 1, the implement 10 includes two bins 26, 30. The first and second bins 26, 30 are supported by the frame 24 and positioned generally above the main frame 12. The bins are utilized to house an amount of material to be applied by the implement 10. As shown in the Figures, the bins include a first bin 26 with a number of side walls 27 and floors 28 defining an interior of the bin for holding the material. A tarp 29 is shown at an upper portion of the bin 26 in order to selectively cover the bin. A second bin 30 also includes sidewalls 31 and floors 32, as well as a tarp 33. A divider wall 34 is provided to separate the first and second bins 26, 30. The divider wall 34 allows for the separation such that the material housed in the bins to be directed towards the pneumatic conveying system of the invention. The bins may also be referred to as hoppers or other containment members, and the particular meaning and/or designation of the components is not to be limiting to the invention. FIG. 3 is a top plan depiction of the implement 10 showing the interior of the first and second bins 26, 30. It is noted the floors 28, 32 of the bins are angled relative to the sidewalls and terminate at an aperture. The floor aperture 35 allows for the material housed in the bins to drop into the material moving meter assembly 40 of the implement, as will be understood and described herein. Furthermore, as is shown in FIGS. 2 and 3, a fan or other fluid source 38 is positioned and operably connected to the implement 10. As will be understood, the fan 38 includes an outlet 39 that is connected to the meter assembly 43 of the material moving meter moving assembly 40 in order to provide pressurized air to move the material from the bins to the row units for application thereat. While a conduit is not explicitly shown in the figures, a hose or other conduit will be connecting the outlet 39 of the fan 38 in an inlet 48 of the meter assembly 43 in order to provide the pressurized there at.

Figure 4:
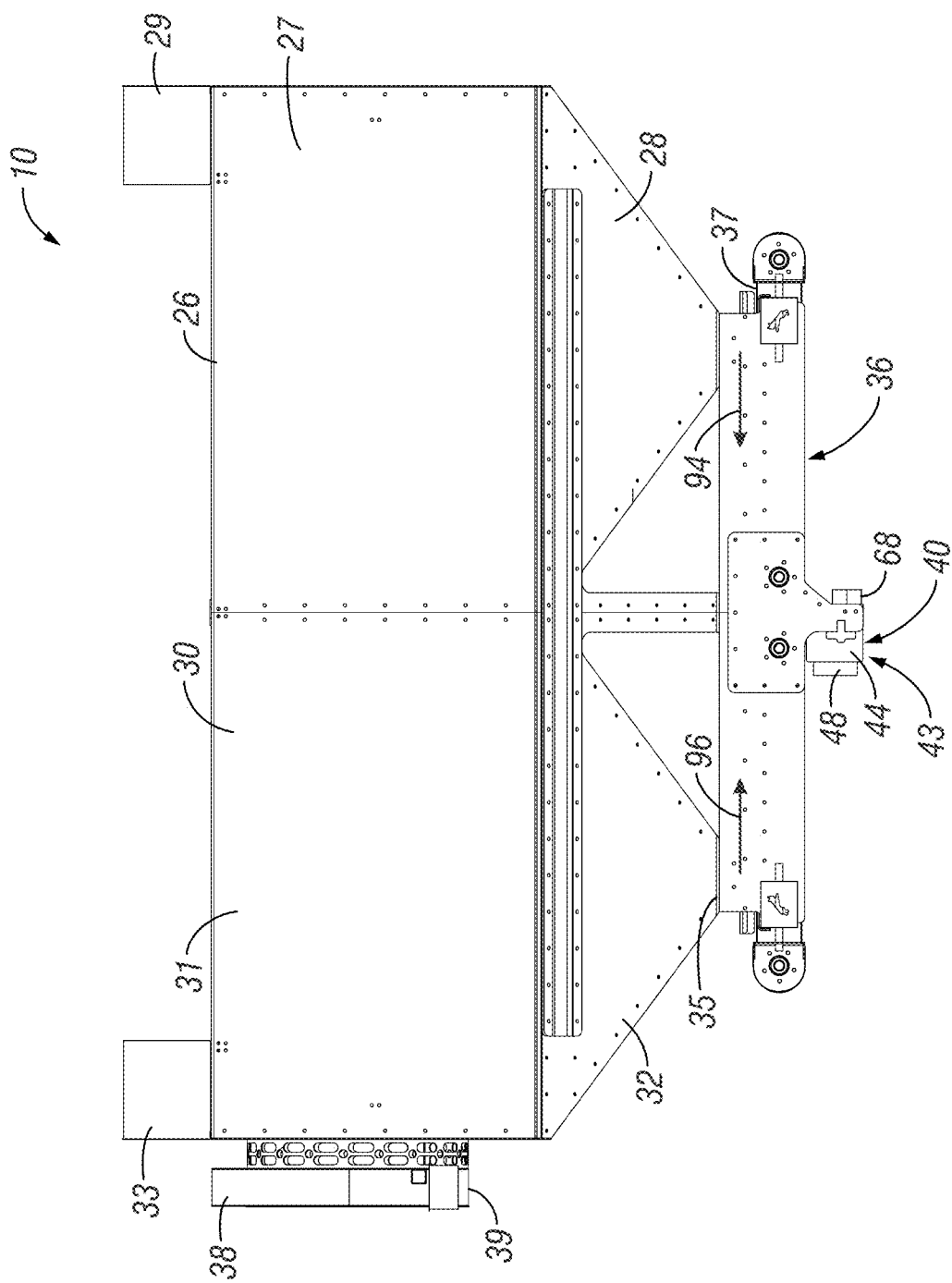
FIG. 4 is a side elevation view of bins and portions of the material moving system for use with the agricultural implement according to aspects of the invention.

FIGS. 4-7 provide additional figures of the implement 10 with some of the frames and toolbar components removed. The figures show enlarged portions of the bins 26, 30, the fan 38, as well as the material moving assembly 40 and the roller assembly 36. As disclosed, the bins will house an amount of material therein, which material is to be transported from the bins to the row units. As noted, the number of row units can be dependent upon the size of the implement and are not to be intended to limit the disclosure herein. It is contemplated that a plurality of row units be spaced along the length of the toolbar. Therefore, the bins will allow the material to move down the floors 28, 32 and out the apertures 35 at the bottom of the bins. At this point, the material will interact with a roller system 36, which includes one or more conveyor members 37. The conveyer members include a belt, chain, tarp, or other material capable of receiving the material and being moved by a motor or other conveying means to move the roller assembly and conveyor 37 towards the material moving meter assembly 40, such as shown in FIG. 4. The direction of the movement is shown generally by the arrows 94, 96 in FIG. 4. The rollers and conveyor 37 can move the material to the material moving meter assembly 40, and the material thereat will drop into the meter assembly 40, such as via the material inlet 41 and will be dispersed among fins 42 into separated segments 60. The material will be maintained in the segment 60 until the pressurized air passes through the meter assembly 43 to direct the material from the meter assembly 43 to the plurality row units. For example, as shown in FIG. 1 a conduit can connect the outlets of the meter assembly 43 and the plurality of row units 21. The conduit will be used to move the material. The conduit can take the form of a hose or other member for moving the material. Therefore, the air will enter the meter assembly 43 via the inlet 48 and will move the material via the conduit to the individual row units 21.

Figure 5:
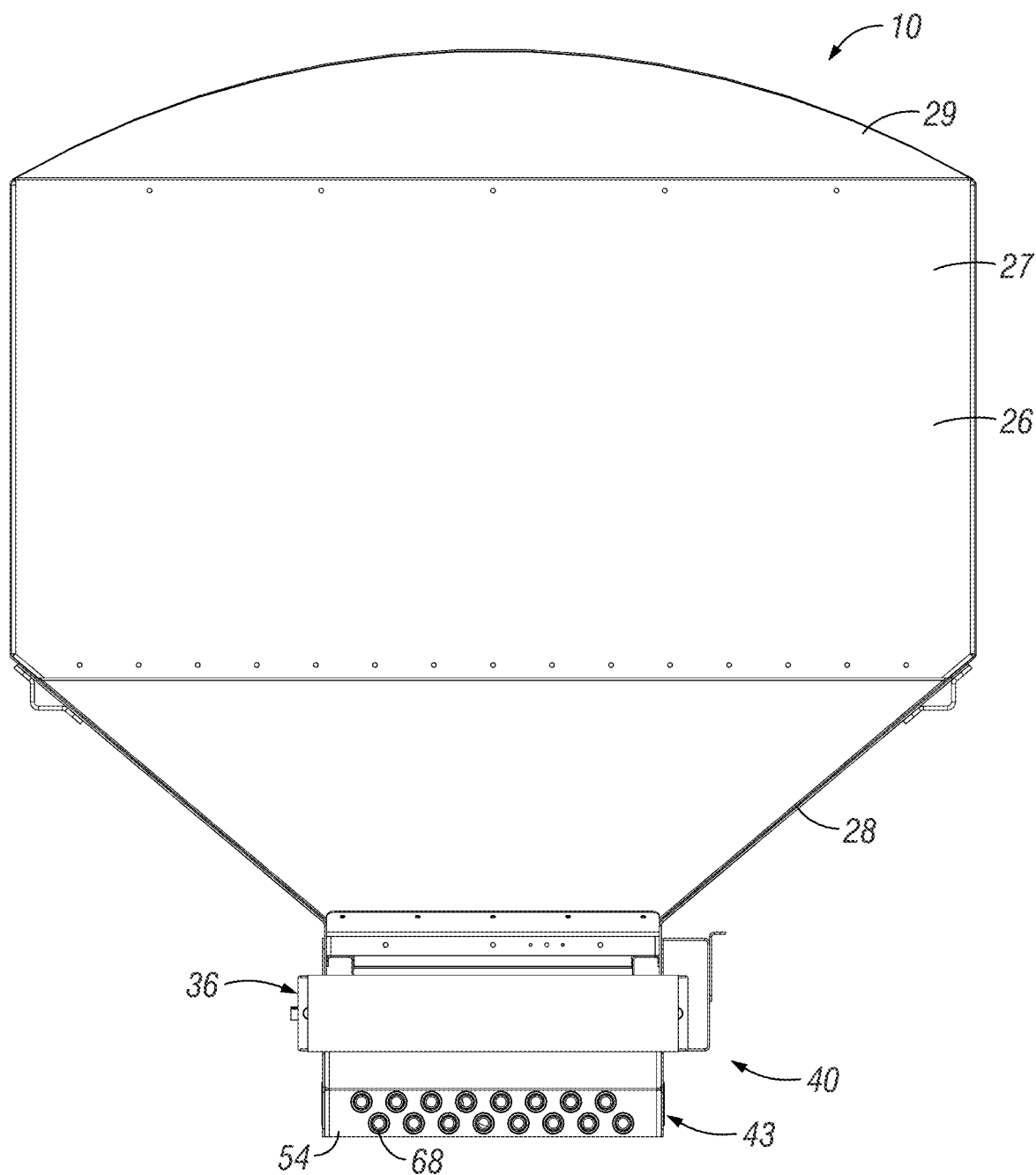
FIG. 5 is a rear elevation view of FIG. 4.
Figure 6:
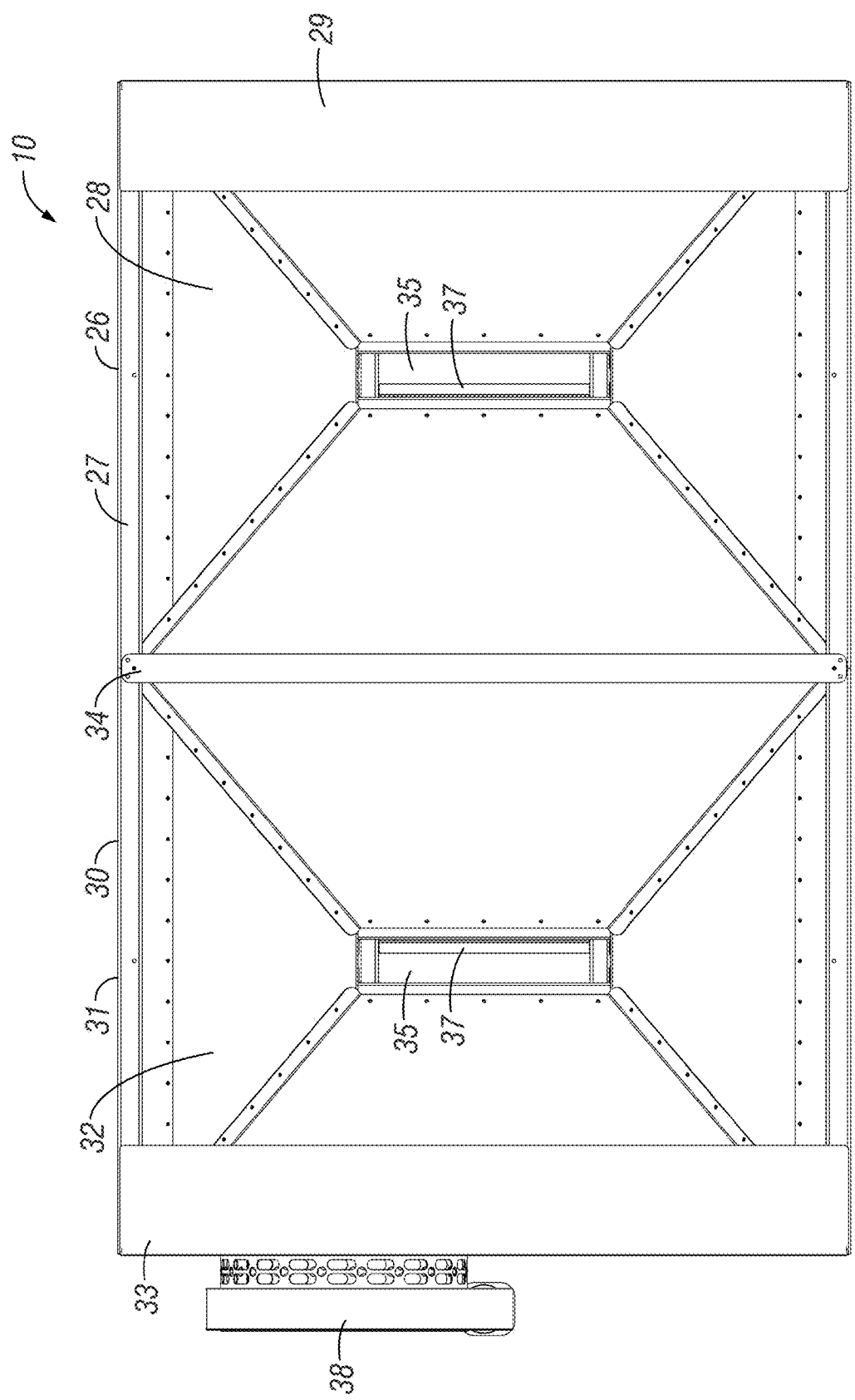
FIG. 6 is a top plan view of FIG. 4.

FIGS. 4-6 show additional views including the location of the fan 38 with the fan outlet 39 positioned generally on one of the side walls 31 of the bin 30. The exact placement of the fan is not to be limiting and is included for exemplary purposes. Additionally, FIG. 5 shows that the number of outlets of the meter assembly 43 can be varied, and generally correspond to the number of row units of the implement. For example, as shown in FIG. 5, there are sixteen outlets from the meter assembly 43. This can correspond to sixteen row units attached to the toolbar of the implement 10, with conduits extended between each row unit and each outlet. Therefore, the sixteen row units will be maintained with the material from the bins via the meter assembly 43 and will continually be fed and supplied with continued amounts of material as the implement moves through the field dispensing the material. However, it should be appreciated that the exact number of outlets in thus, row units need not be limited to sixteen, and generally can include any number. Additionally, the outlets are shown to be staggered to allow for more outlets to be included without increasing the size of the meter assembly 43. Furthermore, it should be appreciated that while a certain number of outlets are shown with the meter assembly 43, they are not required to have a corresponding same number of row units. For example, if sixteen outlets are provided with the meter assembly 43, and only twelve row units are to be used with the implement 10, four of the conduits could be covered or otherwise closed to allow for only twelve outlets to be connected to the corresponding row units to provide material thereto.

Figure 7:
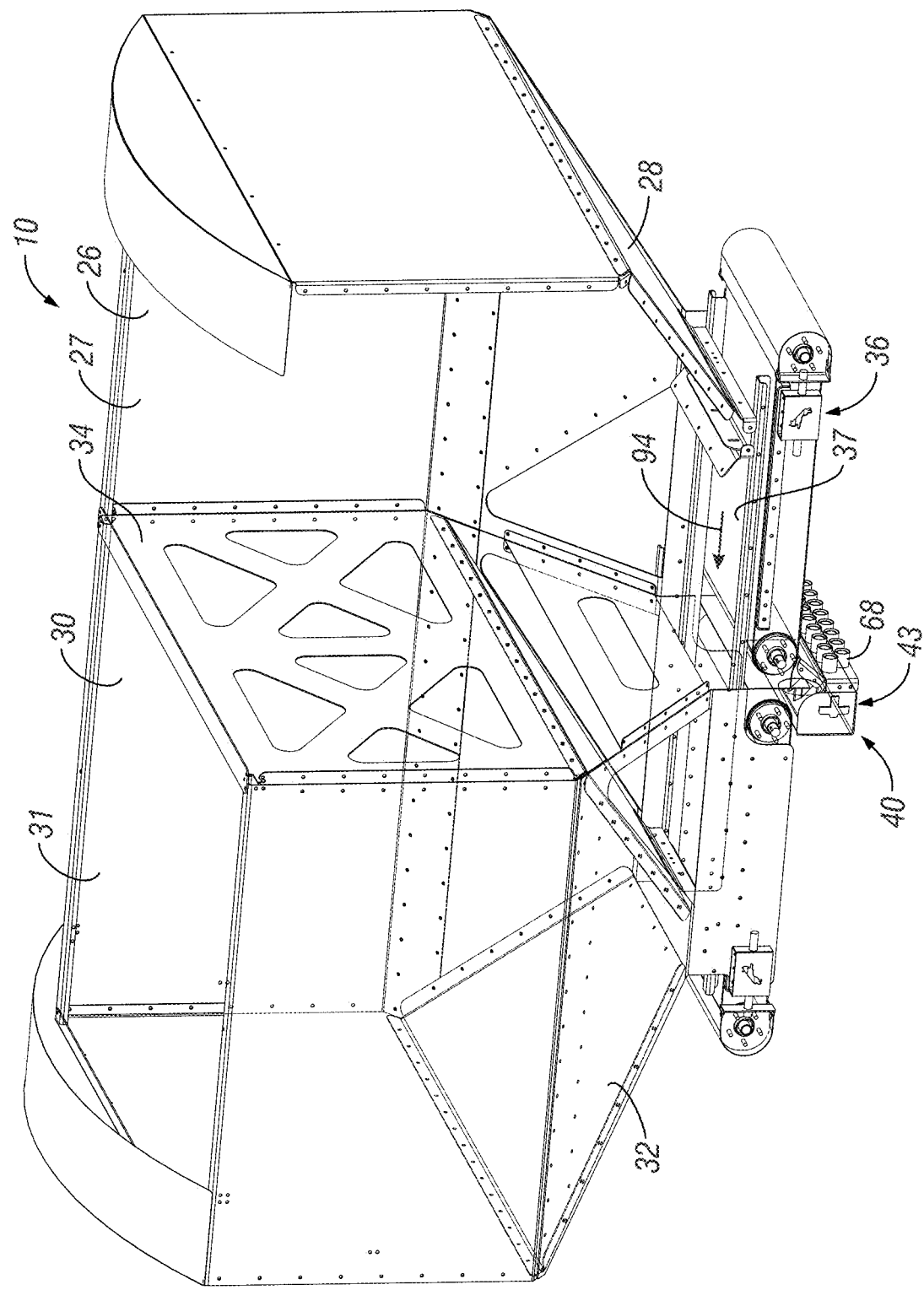
FIG. 7 is a perspective view of FIG. 4 with some components removed.

FIG. 7 is another depiction of the implement 10 with components hidden to show more details of the systems of the implement. For example, portions of the sidewall 27 and floor 28 of the bin 26 have been removed to better show the conveying member 37 of the roller assembly 36. As is shown, the conveyor 37 underneath the bin 26 is sized to terminate generally at or above the meter assembly 43 in order to allow the material moving on the assembly to be deposited into the meter assembly for delivery to the row units. Likewise, a second rolling member and conveying member is positioned generally under the bin 30 and moving in the opposite direction to deposit material from the bin 30 onto the conveying member and then into the meter member 43. Having two bins with two roller assemblies provide a larger amount of material to the meter 43, which can correspond to a larger number of row units and it will into make sure that the row units maintain a sufficient amount of material for application thereat.

Figure 11:
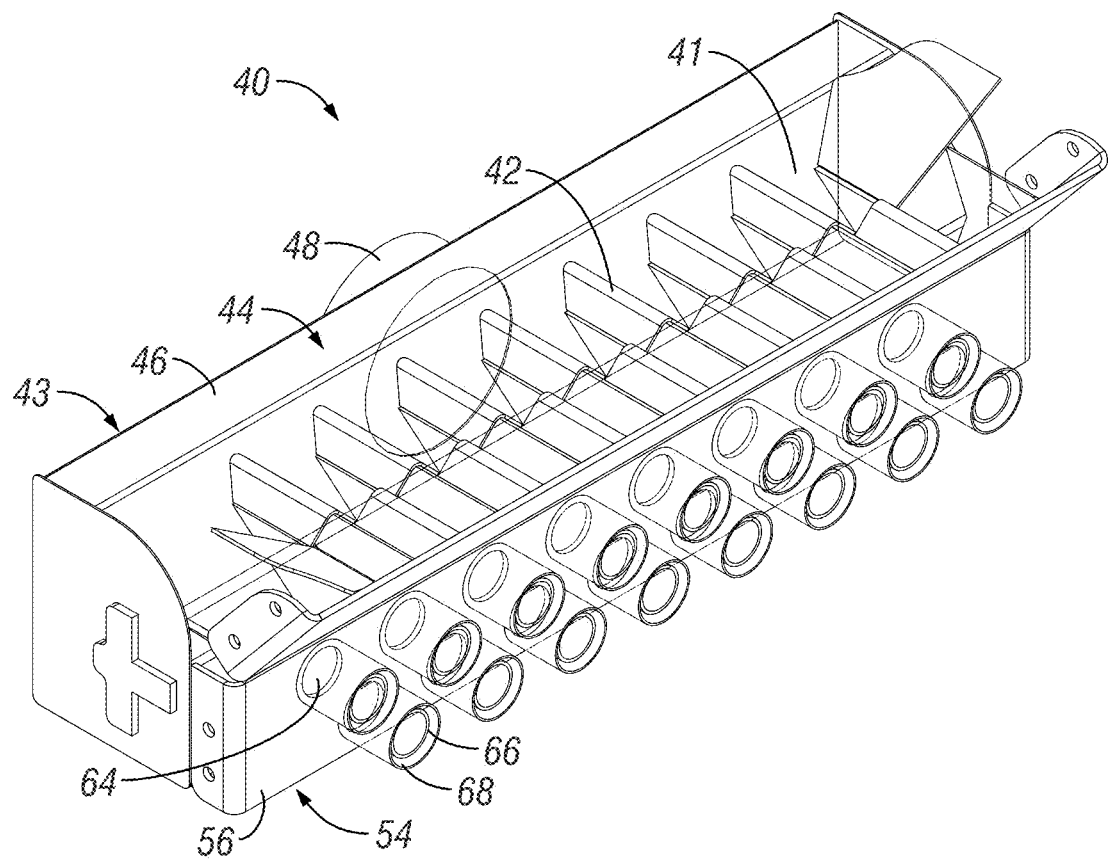
FIG. 11 is a perspective view of a material moving meter assembly according to aspects of the invention.

Moving now to FIG. 11, an exemplary material moving meter assembly 40 is shown. The assembly 40 shown in FIG. 11 includes an inlet portion 41 in which material is deposited into the assembly 40, such as by the rolling assembly 36 as previous shown and described. However, it is contemplated that the bins directly drop material from the interior of the bins into the inlet 41 of the assembly 40 as well. Other manners of providing material to the assembly 40 should be considered to be part of the present disclosure and thus invention.

Figure 12:
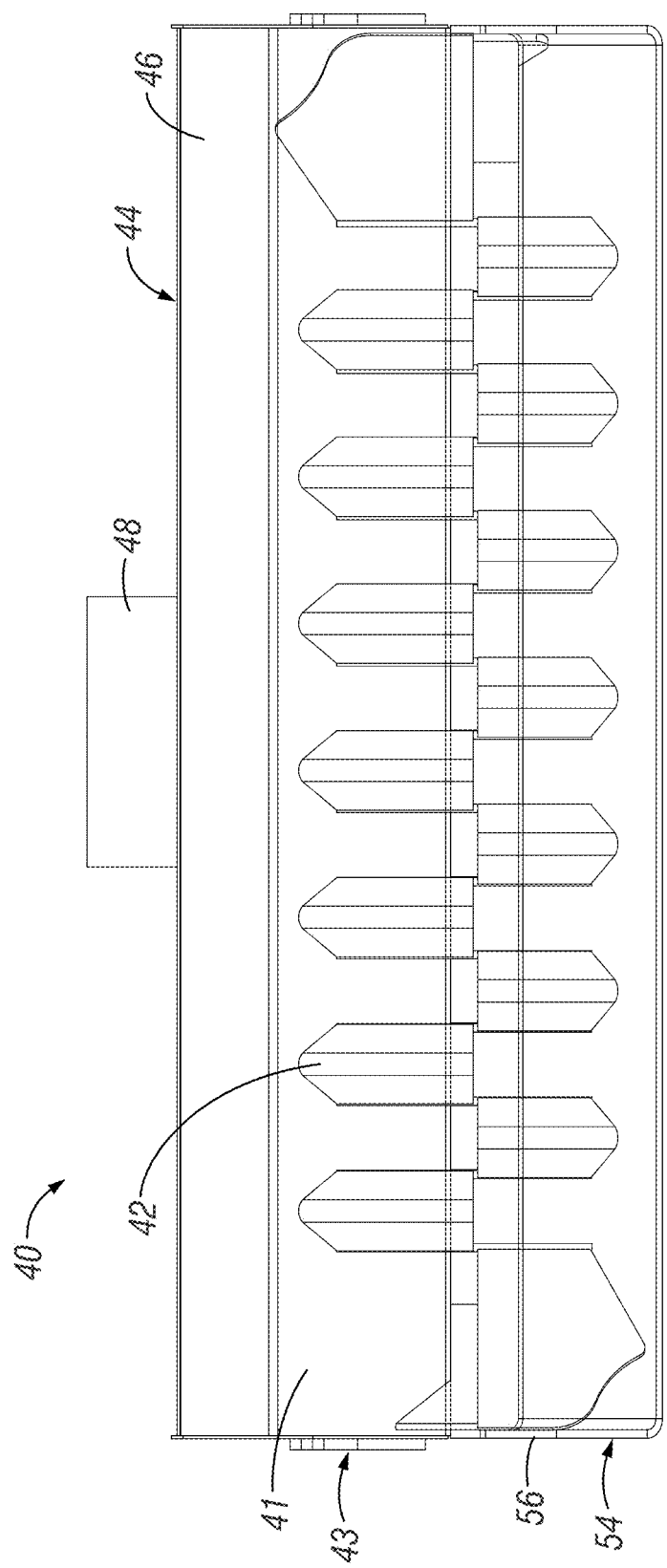
FIG. 12 is a top plan view of the material moving meter assembly of FIG. 11.

Furthermore, as shown in FIGS. 11 and 12, a number of fins 42 are spaced about the inlet 41 of the moving meter assembly 40. The fins 42 may be generally triangularly shaped when viewing at an edge and may have tapered sides, as shown thus in FIG. 12. The fins 42 with the tapered sides provide for guidance in directional urging of the material being deposited at the inlet 41. As will be understand, the meter assembly 43 includes a number of separate segments for providing material to the row units, in which the segments correspond to a particular row unit. The fins 42 are provided to urge the material being deposited into the meter assembly 43 to be directed into the various segments in a coordinated manner such that each segment is able to supply the corresponding row unit connected thereto with a sufficient amount of material. The fins 42 may also be referred to as grates or other members in which the material is urged into the separate segments.

Additional components of the moving meter assembly 40 include a meter assembly 43. The meter assembly 43 generally includes a chamber 44 and a face 54. The face 54, as will be understood, includes outlets that are connected to the row units, such as via the conduits. The chamber 44 provides the inlet for the fluid source, such as via a fan inlet. For example, the inlet 48 may be connected to an outlet of the fan or other fluid source via a conduit or other member in order to provide the pressurized fluid into the system. The chamber 44 may be referred to as a manifold type member in which air or another fluid is introduced via a single passage and is separated out into a plurality of outlets, where the plurality of outlets of the chamber 44 correspond to segments 60 of the face 54, in which the segments 60 correspond to outlets which are connected to the row units.

Figure 13:
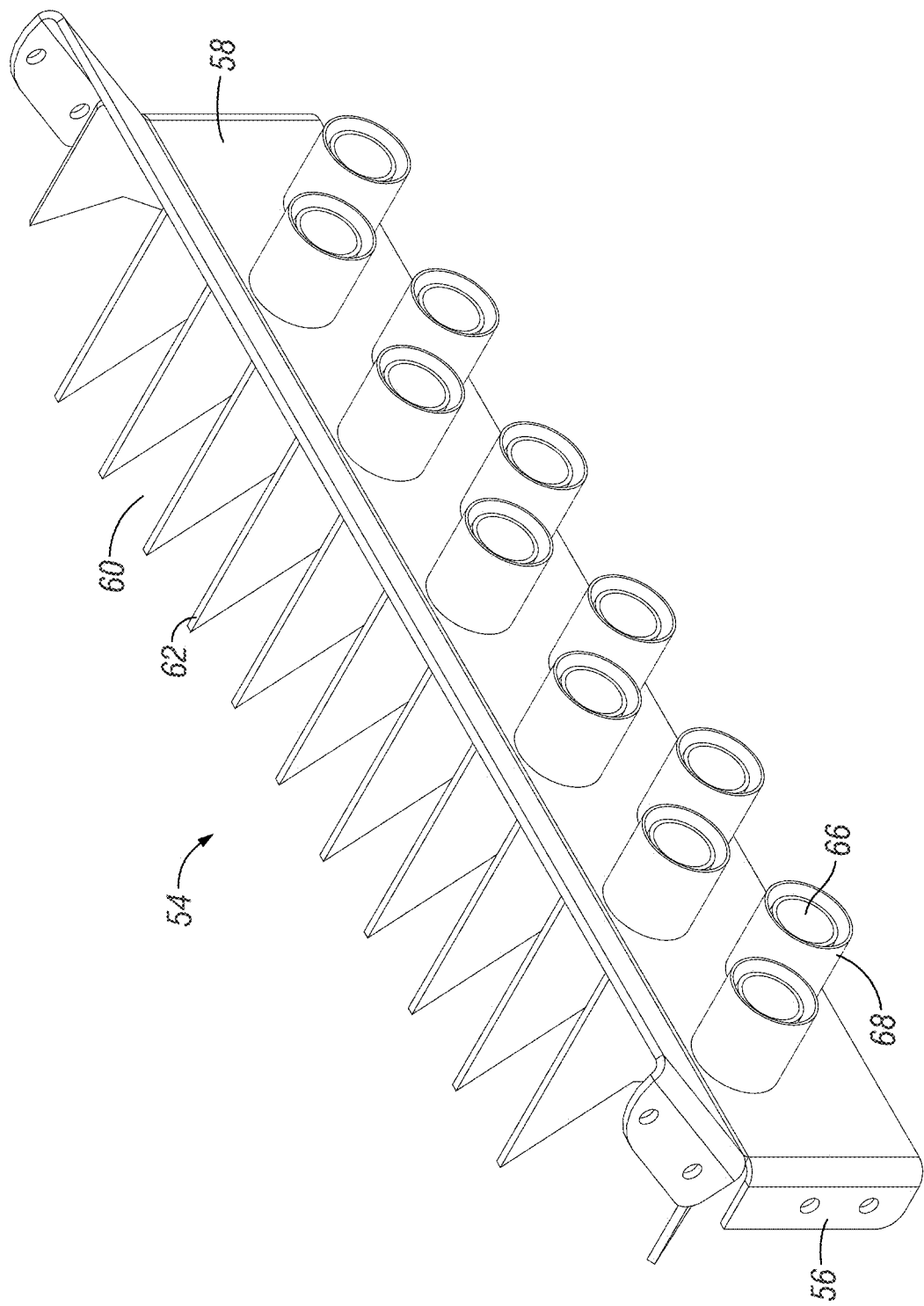
FIG. 13 is a perspective view of a meter face for use with the material moving assembly according to aspects of the invention.
Figure 14:
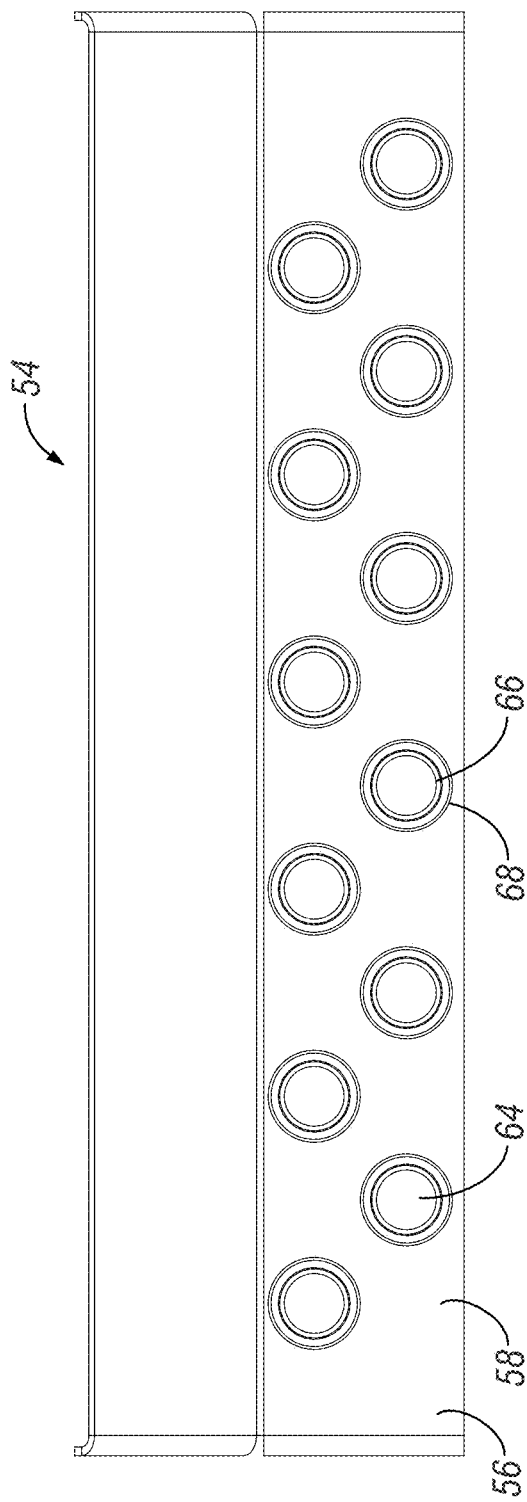
FIG. 14 is a front elevation view of the meter face of FIG. 13.
Figure 15:
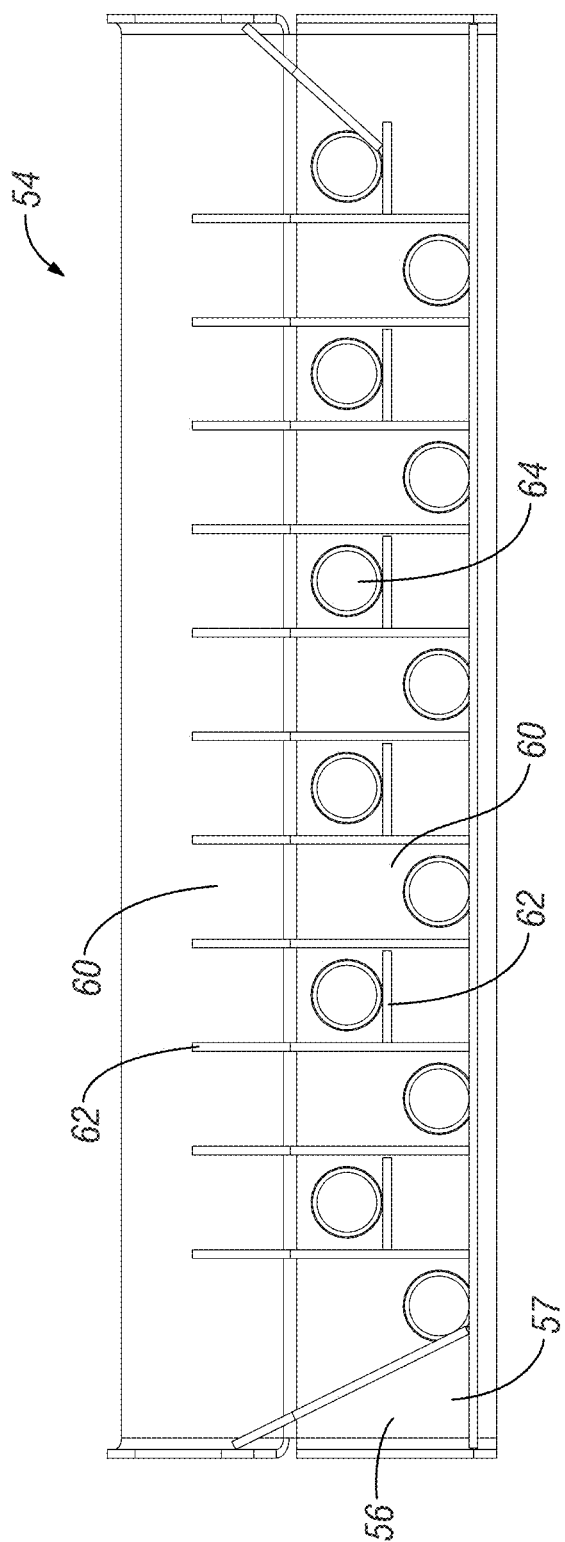
FIG. 15 is a rear elevation view of the meter face of FIG. 13.

The face 54 of the meter assembly 43 is shown in FIG. 13-15. FIG. 13 is a perspective or otherwise isometric view of a depiction of the face 54. As is shown FIGS. 13-15, the face 54 includes a face housing 56 having an inlet side 57 and outlet side 58. The inlet side 57 is shown FIG. 15. The inlet side 57 of the housing 56 is separated into a number of segments 60, which correspond to row units of the implement 10. As is shown in FIGS. 13 and 15, the segments 60 are separated by walls 62 which may be vertical or horizontal. The walls 62 provide a staggering of the outlets 64, which allow for more outlets to be positioned. The walls 62 define the size and number of the segments 60. For example, the walls 62 in conjunction with the chamber 44 will provide segments 60 separated by said walls in which the material deposited into the meter assembly 43 can be held, such as until the meter and fan are activated to move the material from the meter assembly 43 to the row units. The segments 60 allow the material to pool therein and be housed until such time that the material is to be moved to the row units. The number of segments 60 therefore correspond with the number of outlet apertures 64, which correspond to the row unit of the implement as well.

FIGS. 13 and 14 show aspects of the outlet side 58 of the housing 56 of the face 54. As noted, a plurality of apertures 64 are made in and through the housing 56 of the face 54. Positioned generally at the apertures 64 are secondary nozzles 66 and hose couplings 68. The secondary nozzles may be positioned generally at or at least partially within the apertures and the hose coupling 68 can be positioned generally around, or at least partially around the secondary nozzles 66. The secondary nozzles 66 and couplings 68 are shown to be extending generally outward from the housing 56 of the face 54, The secondary nozzles, as will be understood, provide for an increase of the speed of the fluid passing there through to aid in moving the material from the meter assembly 43 to the row units. The hose coupling 68 are used generally to connect the hoses or other conduits between the meter assembly 43 and the row units 21 of the implement 10, as is known.

Figure 16:
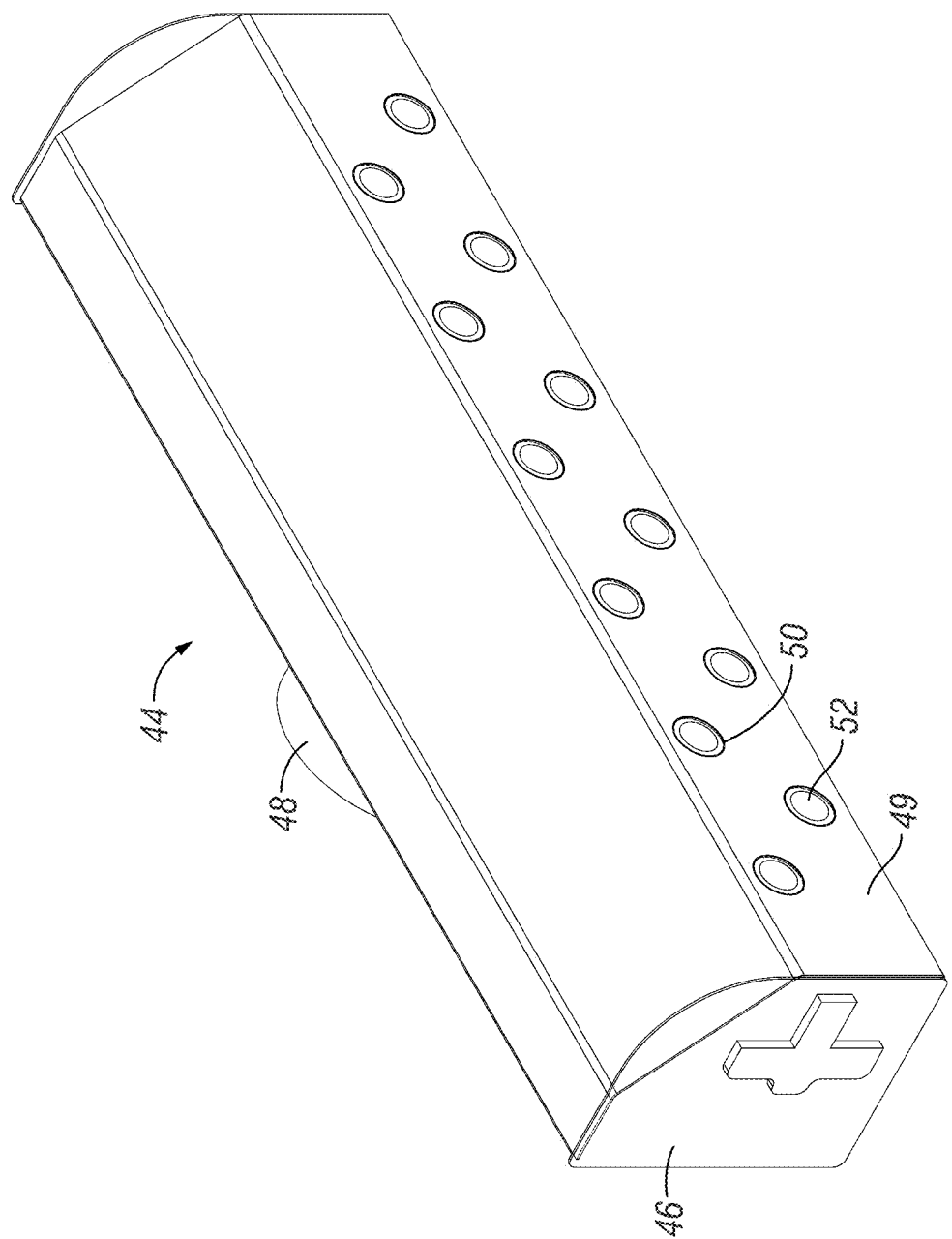
FIG. 16 is a perspective view of a meter chamber for use with the material moving assembly according to aspects of the invention.
Figure 17:
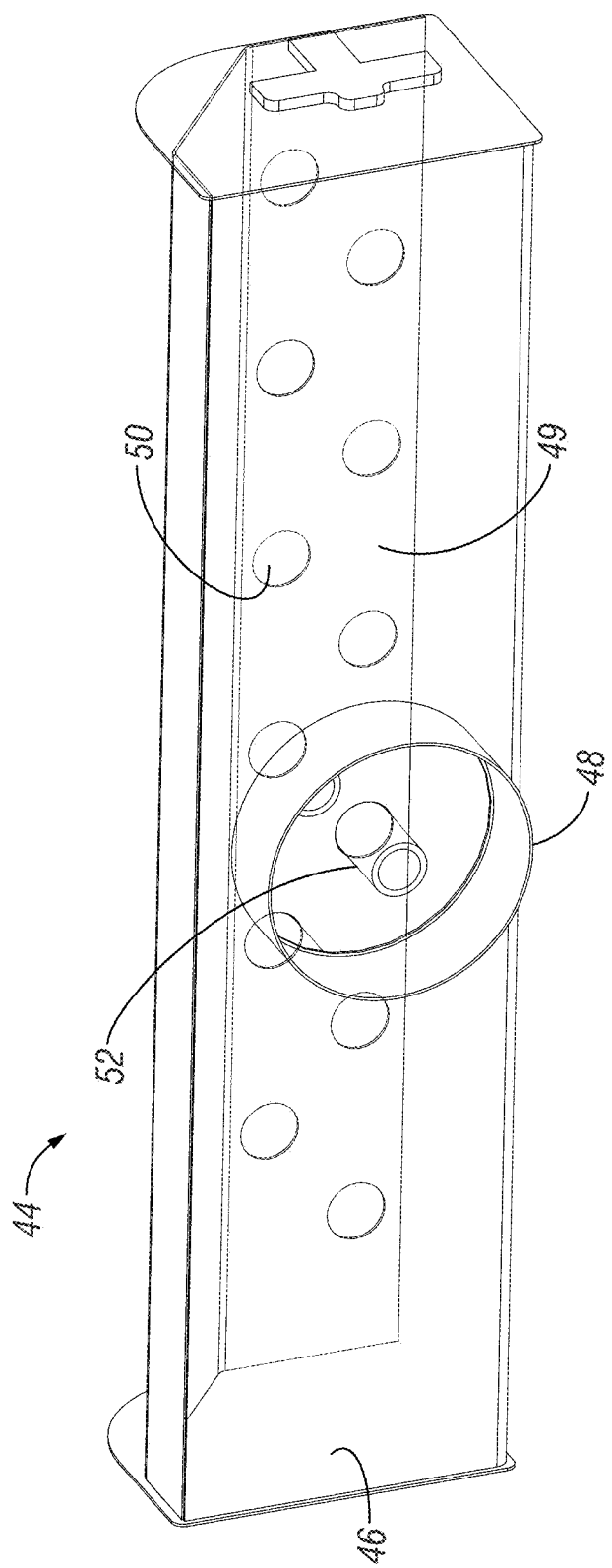
FIG. 17 is a rear perspective view of the meter chamber of FIG. 16.

FIGS. 16 and 17 show exemplary aspects of a chamber 44 for use with the meter assembly 43 according to aspects of the invention. As shown, the chamber 44 includes a housing 46, which generally is an enclosed housing. The enclosure includes an inlet 48, which is used to connect to the fan or other fluid source for providing the pressurized fluid thereto. On an opposite side are a number of outlet apertures 50 in and through the housing 46. The apertures 50 correspond with the segment 60 and thus the outlets 64 to provide for air to move from the inlet 48, through the chamber housing 46, out the aperture 50, through the segment 60, out the aperture 64, through the conduit, and to the row units 21. Therefore, the chamber housing 46 may be referred to as a manifold member in which air is included at a single point 48 and dispersed to be delivered via multiple or a plurality of points 50. This is shown best in FIG. 17 where in the inlet 48 and the exits 50 are shown such that the manifold 49 is understood. In addition, primary nozzles 52 may be included in and associated with each of the outlet apertures 50 of the chamber 44. As will be understood, the primary nozzles provide for a manner to increase the velocity of the air flow through the manifold before interacting with the material in the segments 60 of the face 54 and before moving material from the meter assembly 43 to the row units. As will be understood, the primary nozzle 52 can be sized and utilized with the secondary nozzle 66 in order to best increase the air and to provide additional advantages and otherwise improvements over that which is currently known. The primary nozzles 52 may be at least partially housed within the apertures 50 of the housing 46 of the chamber 44, and can extend generally inward there from, such as shown in FIG. 17.

Figure 8:
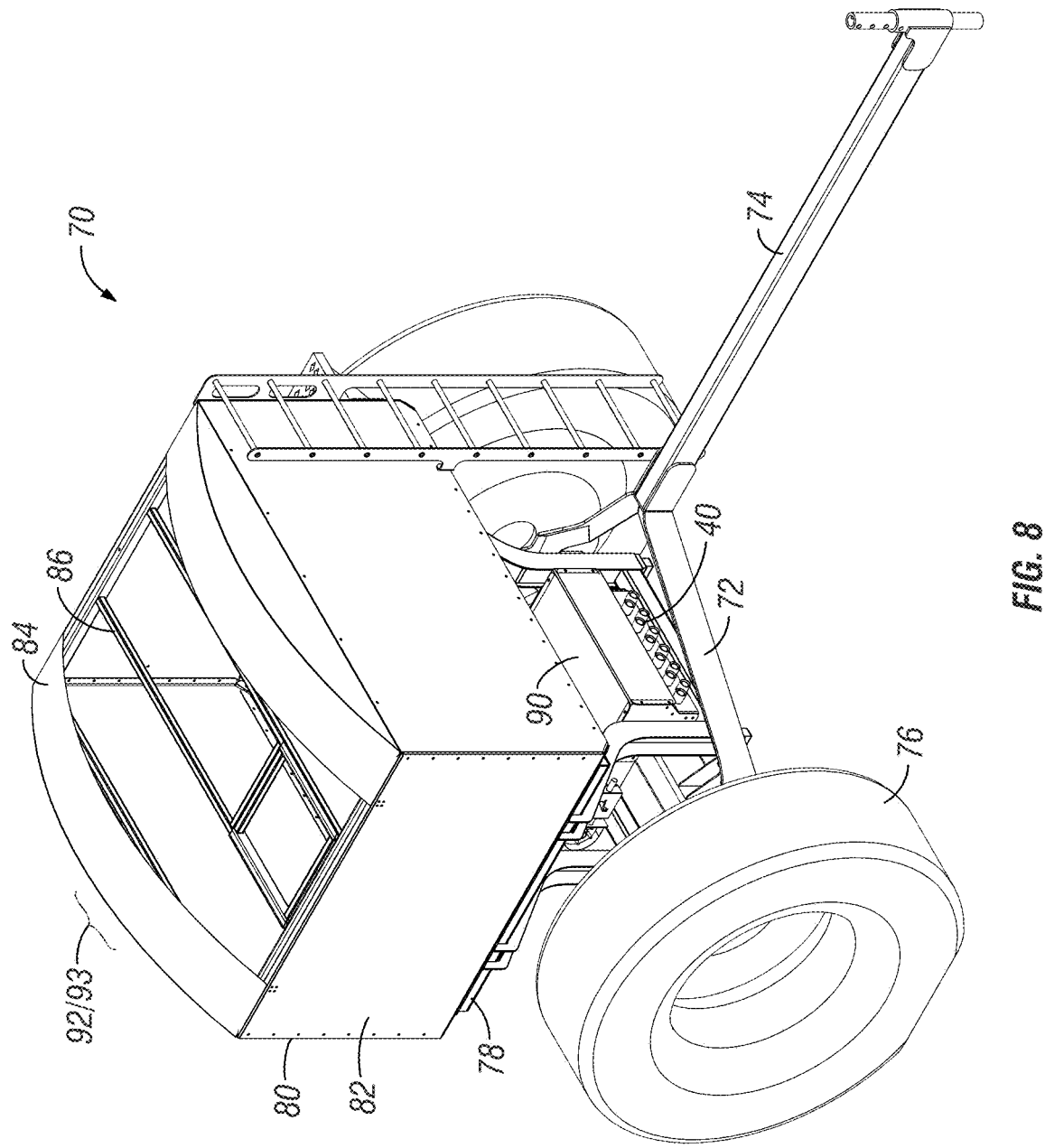
FIG. 8 is a perspective view of another agricultural implement including a material moving system according to aspects of the invention.
Figure 9:
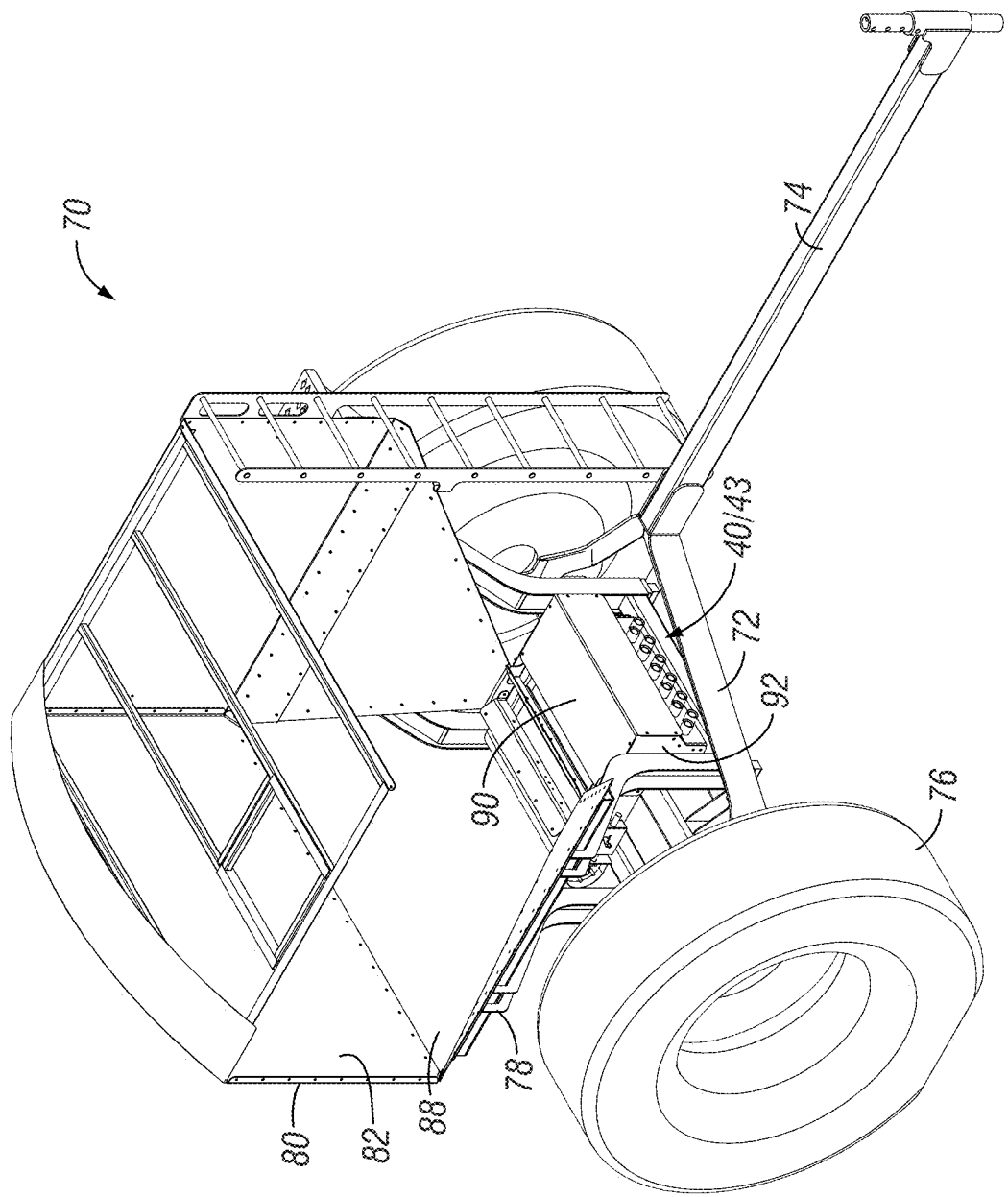
FIG. 9 is a view of FIG. 8 with elements removed.
Figure 10:
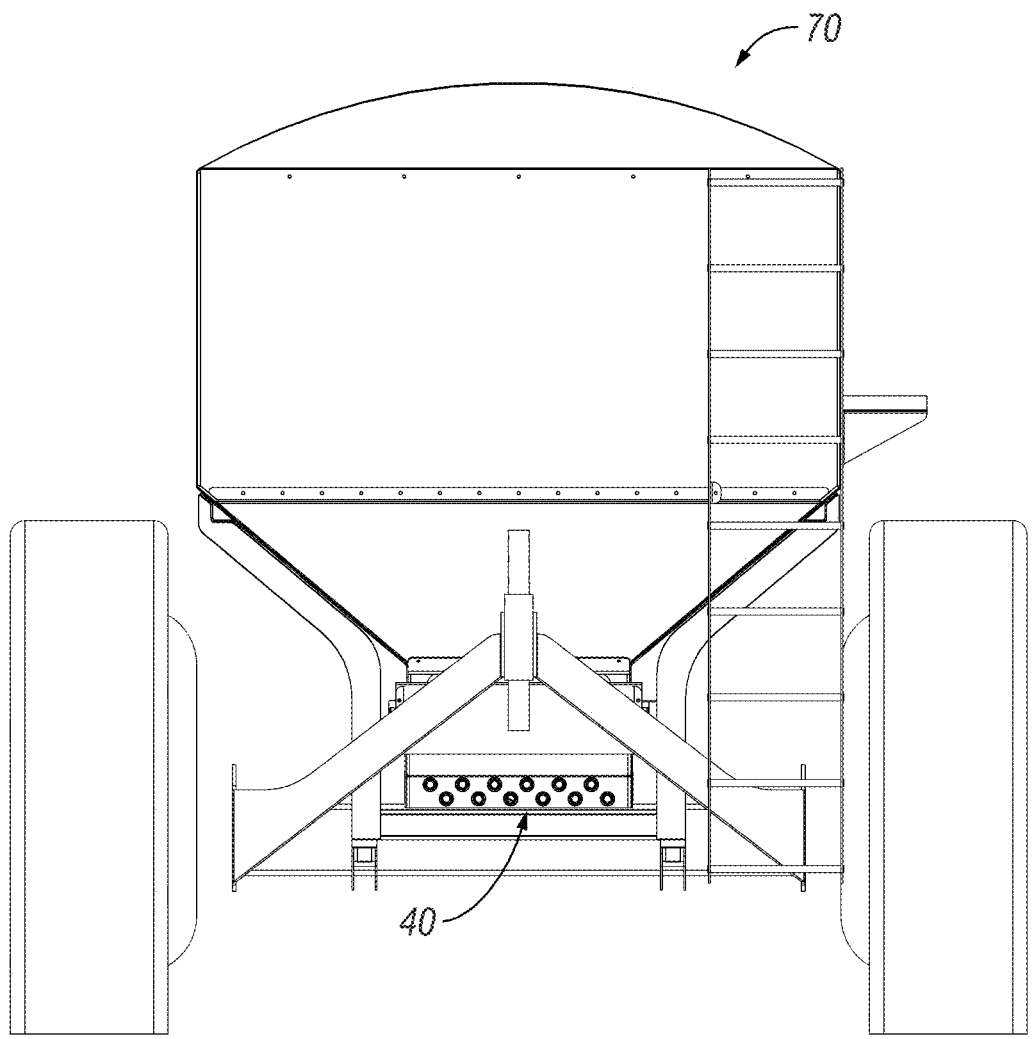
FIG. 10 is a rear elevation view of the agricultural implement of FIG. 8.

FIGS. 8-10 show another depiction of an implement 70 including aspects of the invention, including the meter assembly 43 as disclosed herein. The implement 70 is shown to be an air cart and includes a bin 80 defined by sidewalls 82 and floor 88. A tarp 84 and grates 86 are also included with the implement 70 in order to provide additional structural and covering elements for the air cart 70. A tongue 74 is connected to a frame 72 and wheels 76 provide movement for the air cart. The frame 78 is connected to the frame 72 and is used to support the bin 80 therefrom. As understood, the implement 70 is a single bin cart, but can be made to be a double or twin bin cart as well.

Furthermore, the floors of the bin will terminate in an opening above a roller assembly 90, which includes a conveying member 91 connected to rollers and a motor for moving the conveyor. Material will be dropped from the bin onto the conveyor 91 of roller assembly 90 and will move the material towards a material moving meter assembly 40, such as that shown and described herein. The assembly 40 will include in a meter assembly 43 and can receive material out of inlet 41, which can include fins 42 to separate the material into the various segments 60. As shown in FIGS. 8-10, the meter assembly 43 of the implement 70 includes 12 outlets apertures, which correspond to 12 row units for application of the material. Therefore, the implement is yet another implement and shows the ability of the meter assembly vary according to the desired use and the amount of material needed to be applied.

Therefore, a pneumatic conveyor system using pressurized air passing through primary and secondary nozzles of meter assembly 40 has been shown and described. The pneumatic conveyor system of the meter assembly 43 can be set up and sequenced with the delivery line attached to an exhaust or outlet side of the secondary nozzle 66, such as to the hose coupling 68 surrounding the secondary nozzle 66 to provide the material to be delivered to the row units of the implement. In use, pressurized air can be forced through the primary nozzle 52 in the manifold 49 of the chamber 44, which creates high velocity air flow. Such high velocity air flow can then be passed through the segments 60 of the face 54 and into and through the secondary nozzle 66. At this point, the air can then be passed along to the delivery conduit via the hose coupling 68 and the conduit connected thereto. Material is introduced on the outlet side of the primary nozzle 52, at the segment 60 of the face 54, which is on the intake side of the secondary nozzle 66. At this point, the high velocity air flow from the primary nozzle 52 creates a suction into the air stream now entering the secondary nozzle 66. Once trapped inside the secondary nozzle 66, the air and product or material mixture is forced by high velocity air flow into the delivery conduit, where it is carried to the desired location (e.g., to a row unit or other ground engaging component).

Because of the sizing and placing of the secondary nozzle in relation to the primary nozzle, the system is able to maintain constant suction at the material pickup point, eliminating the need for a close system or a mechanical seal. The high speed air and material mixer in these secondary nozzles 66 acts like both a pump and a seal. It is large enough to pump the delivery line or conduit full, and yet small enough to restrict back pressure, which eliminates blow back into the material pickup chamber, making the system able to deliver high and low density products at the same time. The continuous pumping action of high speed air passing through the secondary nozzle 66 helps to overcome higher static pressures, essentially eliminating or otherwise mitigating plugged delivery lines.

Therefore, it is noted that the sizing of the primary nozzle 52 and the secondary nozzle 66 are needed to work with one another and can be configured in a ratio to meet several working configurations. It has been found that a preferred effective nozzle volume ratio when using a 2 or 2.5-inch hosing (industry standard) is about a 1.9 to 1 ratio. For example, if the primary nozzle is a 3-inch (or about 2-5-inches) long smooth bore tube with an about 0.9-inch diameter (about 0.636 square inches) and the secondary nozzle is a 3-inch long (or about 2-5-inches) smooth bore tube with an about 1.25-inch inner diameter (about 1.23 square inch), the ratio for the areas of the interior of the tubes is approximately 1:1.9. While this ratio may work best for a unit with 24-rows, it is contemplated that other ratios may be better suited for implements with different numbers of row unit/end use points. For example, it is considered that a ratio of 1:1.6 may work for implements with fewer row units, such as 12 or 16 row units. Variations of this ratio will work better than the currently utilized simple venturi, which incorporates a primary nozzle drawing product into a system of hoses and/or pipes without a secondary nozzle. It is noted that the inclusion of the secondary provides for an increased air flow velocity that provides numerous advantages for the system. For example, benefits and or advantages of the inclusion of the secondary nozzle include, but are not limited to the ability to move materials varying in weight and size, little to no line plugging, higher volumes of product delivered, little to no dust, no mechanical seals required, open chambers for easy cleaning, no need to pressurize the tank, and/or the ability to move product farther in delivery conduits.

Additional benefits of the metering and system is that is allows for easier bolting a different meter chamber to an existing machine to change any row configurations, for example, from 5 to 25 rows. This allows the implement to be used for several different applications, such as from broadcast seeding with a boom or vertical tillage tool to injecting fertilizer with a shanked ripper, to strip-tilling with a 24 row tool bar. This simple bolt on features and compact design of the metering assembly 43 allows for this versatility.

Therefore, the invention has been shown and described, and has been shown that it provides numerous advantages and/or benefits over that which is currently used and known. A meter assembly including both a primary nozzle and secondary nozzle can be utilized to increase the air flow through the metering system to provide for better movement of material provided at the metering assembly to an end use location, such as a row unit and/or ground engaging member. Having the ratio as disclosed herein provides for unexpected results, which provides for movement and which also provides for removal of any mechanical seals for a system, such as that shown and described here. The meter assembly is contemplated to include obvious changes thereto and also to be appreciated that any of the aspects disclosed here and can be combined with any of the other aspects to be utilized together or in singularity to provide the benefits disclosed herein, such as for more efficiently moving material.

The invention claimed is:

1. An agricultural implement, comprising:
   at least one bin for holding a material to be applied;
   a plurality of row units operatively connected to the at least one bin to receive an amount of the material and to apply the material; and
   a material moving meter assembly, comprising:
      a meter comprising
         a chamber comprising a manifold with a fan inlet and a plurality of manifold outlets,
         a plurality of segments adjacent the manifold outlets for receiving material from the at least one bin,
         a plurality of primary nozzles in communication with inlets of the plurality of segments, said primary nozzles extending away from the inlets of the plurality of segments at the manifold outlets, and
         a plurality of secondary nozzles at outlets of the plurality of segments; and
      a fan for providing pressurized air to the meter.

2. The agricultural implement of claim 1, further comprising a plurality of conduits, wherein each of the plurality of conduits communicates material from a segment to a row unit.

3. The agricultural implement of claim 1, wherein the meter further comprises a face adjacent the chamber, wherein the face comprises the plurality of segments and the plurality of secondary nozzles extend outwardly from the face towards the plurality of row units.

4. The agricultural implement of claim 3, wherein the face of the meter includes a plurality of walls that separate and define the plurality of segments of the meter.

5. The agricultural implement of claim 3, wherein the chamber of the meter comprises an inlet in communication with the fan, and a plurality of outlets in communication with the plurality of segments of the meter.

6. The agricultural implement of claim 3, wherein the primary nozzles are positioned at least partially within the outlets of the chamber of the meter.

7. The agricultural implement of claim 1, wherein the secondary nozzles are positioned at least partially within conduit connectors.

8. The agricultural implement of claim 1, wherein a ratio of area for sizes of the primary nozzle to the secondary nozzle is about 1:1.9.

9. The agricultural implement of claim 8, wherein the primary nozzle has an inner diameter of about 0.9-inch, and the secondary nozzle has an inner diameter of about 1.25-inches.

* * * * *